United States Patent [19]

Kobayashi et al.

[11] Patent Number: 5,611,985
[45] Date of Patent: Mar. 18, 1997

[54] METHOD OF MANUFACTURING A POLYSULFONE RESIN FILM AND A RETARDATION FILM

[75] Inventors: Hitoshi Kobayashi; Takao Saito, both of Hasuda, Japan

[73] Assignee: Sekisui Chemical Co., Ltd., Osaka, Japan

[21] Appl. No.: 449,666

[22] Filed: May 24, 1995

[51] Int. Cl.$^6$ .............................. B29C 55/06; B29C 55/08
[52] U.S. Cl. .......................... 264/291; 524/609; 524/367; 524/108; 524/110
[58] Field of Search .................................. 524/609, 108, 524/110, 367; 264/291

[56] References Cited

U.S. PATENT DOCUMENTS

| | | | |
|---|---|---|---|
| 3,875,096 | 4/1975 | Graefe et al. | 260/29.2 N |
| 5,096,585 | 3/1992 | Nguyen | 264/41 |
| 5,472,538 | 12/1995 | Minakuchi et al. | 156/85 |

FOREIGN PATENT DOCUMENTS

| | | |
|---|---|---|
| 0365916 | 5/1990 | European Pat. Off. . |
| 3740871 | 6/1988 | Germany . |
| 2-111511 | 4/1990 | Japan . |
| 06235816 | 8/1994 | Japan . |
| 07092322 | 4/1995 | Japan . |

*Primary Examiner*—Mark D. Sweet
*Attorney, Agent, or Firm*—Townsend & Banta

[57] ABSTRACT

The present invention provides an improved solution casting method to manufacture, with high productivity, a polysulfone resin film superior in quality including appearance, surface smoothness, transparency and thickness accuracy. A polysulfone resin film is cast using the solution casting method in which a solution of polysulfone resin is cast on a support base to a desired thickness, dried to remove the solvent, and resultant resin film is peeled away from the support piece. The solution of polysulfone resin comprises at least one solvent chosen from among anisole, dioxane or tetrahydropyrane. To shorten the drying time even further, at least one solvent chosen from among acetone, methylethylketone, ethyl acetate, toluene and phenol can be mixed in the casting solution of polysulfone resin. The resultant polysulfone film obtained can be uniaxially stretched to produce a high-quality retardation film with superior optical properties.

15 Claims, No Drawings

METHOD OF MANUFACTURING A POLYSULFONE RESIN FILM AND A RETARDATION FILM

FIELD OF THE INVENTION

The present invention relates to a high-productivity method of manufacturing a high-quality polysulfone resin film with superior transparency by using the solution casting method and a high-quality retardation film with superior optical properties by using the polysulfone resin film.

BACKGROUND OF THE INVENTION

Polysulfone resin films are generally manufactured by means of the hot-melt extrusion method and the solution casting method. These films are known to be superior in optical properties, mechanical strength properties, electrical properties, transparency, heat resistance, flame resistance, etc. Because of these superior properties, this film is, for example, stretched and used as an optical filter such as a phase retarder for a liquid crystal display device.

When manufacturing a film by the solution casting method, the solution viscosity is relatively low, and therefore it is possible to remove foreign matter by using fine mesh filters. As a result, this film develops very few fisheyes (defects in transparent or half-transparent plastic films or sheets which look like small spherical lumps; one of the reasons why they are generated is that mixing is not sufficient between those lumps and the surrounding resin), and tends to be superior in appearance, surface smoothness, transparency and thickness accuracy.

When manufacturing a polysulfone resin film by the aforementioned solution casting method, a methylene chloride solution of polysulfone resin is widely used as a resin casing solution.

For example, a polysulfone resin film is obtained by casting a methylene chloride solution of this resin onto a support piece using an appropriate coater, evaporating the solvent, and peeling the film-like product thus formed from the support piece.

This manufacturing method is superior in that said methylene chloride is non-inflammable, has a low boiling point (approximately 40° C.), and is a polar solvent with a high drying efficiency. However, when the polysulfone resin is dissolved in methylene chloride, ringed polymers and low molecular weight components which are byproducts of the synthesis of the polysulfone resin gradually aggregate and crystallize in the solution and become non-soluble in methylene chloride, resulting in precipitation of said crystals in the resin solution.

As a result, if the crystals precipitate during the process before the solution is cast on the support piece, the filter becomes clogged. Also, if the crystals precipitate during the process after the solution is cast on the support piece, the transparency of the film decreases and foaming occurs around the crystalline nuclei, resulting in problems such as poor appearance, and the optical properties of a retardation film deteriorates obtained by using the film.

Also, methylene chloride moves slow in the resin and evaporates quickly from the surface of the resin solution, which results in the so-called dried thin-layer phenomenon (the phenomenon in which a dried thin-layer is formed on the surface) during the initial stage of drying. If the thickness of the polysulfone resin film being manufactured is 50 micrometers or more, the methylene chloride may be caught in the film-like product or between the film-like product and the support piece, resulting in foam in the film-like product.

Drying said resin film sufficiently while preventing this foaming involves a prolonged drying time, which leads to another problem, i.e. reduced productivity of said resin film.

Another reason for the prolonged drying time is that polysulfone resin forms a pseudo-linkage with methylene chloride, unlike polycarbonate resin, polyarylate resin and cellulose triacetate which are also made into films by means of the solution casting method using the same methylene chloride solution. The pseudo-linkage forms a complex of polysulfone and methylene chloride. Although methylene chloride is originally a solvent with a low boiling point, because of the formation of a complex, a high temperature or prolonged drying is required to sufficiently dry it, resulting in reduced productivity.

SUMMARY OF THE INVENTION

The object of the present invention is to provide a method which uses the solution casting method to manufacture, with a high productivity, a polysulfone resin film superior in appearance, surface smoothness, transparency and thickness accuracy, and a retardation film with superior optical properties. It was unexpectedly discovered that this object could be achieved by:

(1) A method of manufacturing a polysulfone resin film using the solution casting method wherein a solution of polysulfone resin using at least one solvent is chosen from among anisole, dioxane or tetrahydropyrane.

(2) A method of manufacturing a polysulfone resin film described in (1) above, wherein at least one solvent chosen from among acetone, methylethylketone, ethyl acetate, toluene and phenol is mixed in the anisole solution, dioxane solution or tetrahydropyrane solution of polysulfone resin.

(3) A method of manufacturing a retardation film by uniaxially stretching a polysulfone resin film obtained by the method described in (1) and (2) above.

The present invention is described in detail below.

DETAILED DESCRIPTION OF THE INVENTION

In the present invention, "the solution casting method" represents a method of manufacturing a resin film in which a resin solution prepared by dissolving the resin in a solvent is casted on a support piece so as to have the desired thickness. The solvent is removed by drying, and finally the resin film is peeled from the support piece to obtain the film (see Tokkai Hei 2-111511 for example).

"Polysulfone resin" is a thermoplastic resin obtained by a condensation reaction between dichlorodiphenylsulfone or chlorophenylhydroxyphenylsulfone and bisphenol A which contains a polymer molecule shown in the following chemical formula (1), for example. The phenylene units (benzene rings) are bonded with sulfone groups, ether bonding and isopropylidene groups, and these three bonding components are known to function as internal stabilizers.

[Chemical formula 1]

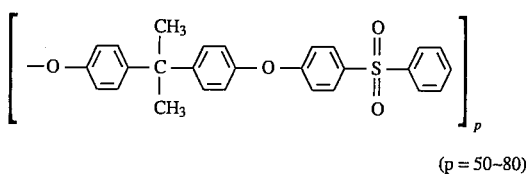

(p = 50~80)

Specific examples include polysulfone resin whose polymer molecule comprises paraphenylenes interconnected with sulfone, ether and isopropylidene, and polyether sulfone resin whose polymer molecule comprises paraphenylenes interconnected with sulfone and ether. It is preferable to use for said resin one that has a weight average molecular weight (in polystyrene equivalent) of 20,000 to 100,000 as measured by the GPC measurement method. It is not preferable to have said weight average molecular weight Lower than this range because then the film strength is reduced. Also, it is not preferable if it is higher than this range because then the viscosity of the resin solution rises excessively and the appearance and the quality of the product deteriorate.

In forming the resin solution for casting, these polysulfone resins are dissolved in at least one solvent chosen among anisole, dioxane or tetrahydropyrane to obtain an anisole solution, dioxane solution or tetrahydropyrane solution of the polysulfone resins. It is preferable to adjust the concentration of the polysulfone resin such that the solution viscosity is $1\times10^3$ to $1\times10^5$ cps at the room temperature so that the coating appearance, and smoothness in particular, is maintained by leveling. For example, when using a polysulfone resin with a weight average molecular weight (in polystyrene equivalent) of approximately 60,000, it is preferable to prepare the solution such that the resin concentration is 15 to 40wt %.

When preparing the anisole solution of polysulfone resin, anisole may be used independently. However, for the purpose of lowering the boiling point of anisole (approximately 154° C.) and thus making the drying time even shorter and improving productivity, and also for the purpose of lowering the viscosity of the anisole solution for a better coating appearance, it is also possible to mix in a "poor solvent", i.e. a solvent which is compatible with anisole, does not deteriorate transparency and/or stability during storage of the polysulfone resin solution, has a lower boiling point than anisole, and does not dissolve more than 1 wt % of polysulfone resin. Examples include one or more solvents chosen from among acetone, methylethylketone, ethyl acetate, toluene and phenol, or a mixture of these.

When mixing the poor solvent described above in anisole, the content should be 60 wt % or less of the total solvent (the mixture of anisole and the poor solvent). It is preferred that the content of the poor solvent be 60 wt % or less because if it is higher the solubility of the polysulfone resin can deteriorate, resulting in fish-eyes and such.

When preparing the dioxane solution of polysulfone resin, dioxane may be used independently. However, for the purpose of lowering the boiling point of dioxane (approximately 102° C.) and thus making the drying time even shorter and improving productivity, and also for the purpose of lowering the viscosity of the dioxane solution for a better coating appearance, it is also possible to mix in a "poor solvent", i.e. a solvent which is compatible with dioxane, does not deteriorate transparency and/or stability during storage of the polysulfone resin solution, has a relatively low boiling point, and does not dissolve more than 1 wt % of polysulfone resin. Examples of such poor solvents include one or more solvents chosen from among acetone, methylethylketone, ethyl acetate, toluene and phenol or a mixture of these.

When mixing the poor solvent described above in dioxane, the content should be 60 wt % or less of the total solvent (the mixture of dioxane and the poor solvent). It is preferred that the content of the poor solvent be 60 wt % or less because if it is higher the solubility of the polysulfone resin can deteriorate, resulting in fish-eyes and such.

When preparing the tetrahydropyrane solution of polysulfone resin, tetrahydropyrane may be used independently. However, for the purpose of lowering the boiling point of tetrahydropyrane (approximately 88° C.) and thus making the drying time even shorter and improving productivity, and also for the purpose of lowering the viscosity of the tetrahydropyrane solution for a better coating appearance, it is also possible to mix in a "poor solvent", i.e. a solvent which is compatible with tetrahydropyrane, does not deteriorate transparency and/or stability during storage of the polysulfone resin solution, has a relatively low boiling point, and does not dissolve more than 1 wt % of polysulfone resin. Examples include one or more solvents chosen from among acetone, methylethylketone, ethyl acetate, toluene and phenol, or a mixture of these.

When mixing the poor solvent described above in tetrahydropyrane, the content should be 60 wt % or less of the total solvent (the mixture of tetrahydropyran and the poor solvent). It is preferred to have the content of the poor solvent be 60 wt % or less because if it is higher the solubility of the polysulfone resin can deteriorate, resulting in fish-eyes and such.

A plasticizer can be added to the polysulfone resin solution as necessary so as to improve the flexibility of the film. Examples of suitable plasticizers include phthalic acid type, phosphoric acid type, adipic acid type, citric acid type and glycolic acid type plasticizers. Specifically, diethyl phthalate, butylbenzyl phthalate, tricresyl phosphate and methyl phthalyl ethyl glycolate are preferable because they have a high compatibility with polysulfone resin and they do not cause a defective appearance such as devitrification.

Although up to 30 wt % of said plasticizer can be added to the polysulfone resin, the mount should preferably be 10 wt % or less of said resin.

The temperature at which the polysulfone resin is dissolved in the solvent is not necessarily room temperature. For example, when preparing the anisole solution, it is possible to improve the dissolution rate of said resin by means of heating, as long as the temperature stays at 154° C., i.e. the boiling point of anisole, or lower. In this case, it is necessary to pay attention to the amount of the vaporized solvent. When preparing the dioxane solution, it is possible to improve the dissolution rate of said resin by means of heating, as long as the temperature stays at 102° C., i.e. the boiling point of dioxane, or lower. When preparing the tetrahydropyrane solution, it is possible to improve the dissolution rate of said resin by means of heating, as long as the temperature stays at 88° C., i.e. the boiling point of tetrahydropyrane, or lower.

Using a conventional prior art solution casting method, the anisole solution, dioxane solution or tetrahydropyran solution of polysulfone resin thus prepared is cast on a support piece with an endless belt or drum form, by using a comma coater, lip coater, die coater, doctor blade coater, bar coater, roll coater etc. The solvent is then removed by heat-drying, and the film-like product thus formed is peeled from the support piece to obtain a long-form polysulfone resin film. Also, a short-form polysulfone resin film can be obtained with the batch method using a sheet-shaped support piece.

For the material of the support piece, metals including copper and stainless steel and synthetic resins can be used. The surfaces of these metals or synthetic resins can be coated with glass or ceramics, and the support piece can be treated with a separating agent such as silicone resin or fluororesin.

Heat-drying of the resin solution cast on the support piece is conducted by using a temperature rising rate which does not cause foaming in the film-like product. When manufacturing the polysulfone resin film from the anisole solution of polysulfone resin, the temperature is increased to the boiling point of anisole or higher, 190° to 220° C. for example. When manufacturing the polysulfone resin film from the dioxane solution of polysulfone resin, the temperature is increased to the boiling point of dioxane or higher, 150° to 200° C. for example. When manufacturing the polysulfone resin film from the tetrahydropyrane solution of polysulfone resin, the temperature is increased to the boiling point of tetrahydropyrane or higher, 100° to 150° C. for example.

The desired polysulfone resin is thus manufactured. The thickness of the film is generally in the range of 10 to 250 micrometers, depending on applications. This film can either be used as is, i.e. in the unstretched state, or it can be stretched, laminated or coated before use.

A method of manufacturing a retardation film according to the present invention comprises uni-directional stretching of the film obtained by the aforementioned solution casting method for manufacturing films.

For the method of stretching the film, either the vertical uniaxial roll stretching method, the vertical (machine direction) uniaxial zone stretching method or the horizontal (transverse direction) uniaxial tenter stretching method can be used. It is important to make sure the stretching is done in only one direction. The retardation value increases as the stretching ratio increases and/or the film thickness increases.

For the stretching conditions, the film temperature is 160° C.–220° C., preferably 180° C.–200° C., and the stretching ratio is preferably 1.1–2. The thickness after stretching is preferably 30 micrometers–200 micrometers. If the stretching ratio is less than 1.1 the desired retardation value cannot be obtained. If it is more than 2 then the film tends to rupture. If the thickness is less than 30 micrometers then the mechanical strength is low and insufficient for practical use. If it is more than 200 micrometers then the lamination compatibility between the obtained retardation film and the polarizer plate deteriorates.

In the solution casting method, when an anisole solution, dioxane solution or tetrahydropyrane solution of polysulfone resin is used, such anisole, dioxane or tetrahydropyrane keeps ringed polymers and/or low molecular weight components in said resin from crystallizing in the resin solution. Therefore, deposition of crystals does not occur in the resin solution, thus preventing foaming of the film-like product and a reduction in transparency.

Also, anisole, dioxane and tetrahydropyrane move faster in polysulfone resin than an evaporation-drying speed on the surface of the resin solution, and therefore the dried thin-layer phenomenon does not easily occur in the initial stage of the drying process. In addition, since they do not form complexes with polysulfone, foaming in the film-like product is suppressed even when manufacturing a film with a thickness of 50 micrometers or more, and thus the rate at which the temperature rises can be increased for faster drying, resulting in shorter drying times.

If a plasticizer is added to the film then the thermal deformation temperature decreases when stretching the cast film, and therefore the stretching temperature can be set lower. This also results in superior stretching characteristics and homogeneous stretching.

EXAMPLES

Examples and comparative examples of the present invention are described below. The method of manufacturing a polysulfone resin film of the present invention is not limited to these examples.

Example 1

Udel-polysulfone resin with a weight average molecular weight (in polystyrene equivalent) of approximately 60,000 (product name P-3500 from Teijin Amoko Engineering Plastic Co., Ltd.) was dissolved in anisole to prepare an anisole solution of polysulfone resin with a solid content of 35 wt %.

A roll coater was used to apply this solution on a polyester film, which was then put into a heating oven with a temperature of 140° C. The temperature was then raised to 210° C. at the maximum temperature rising rate which would not cause foaming in the applied film-like product, and the drying process was continued until the amount of the residual solvent in the film was 1 wt % or less. Finally, the film was peeled to obtain a polysulfone resin film with a thickness of 50 micrometers.

The drying time was as short as 1 minute. The film thus obtained had a cloudiness (haze) of 0.14%, a smooth surface, excellent transparency and excellent thickness accuracy.

Example 2

The polysulfone resin used in Example 1 was dissolved in a mixed solution of anisole and methylethylketone (weight ratio 8:2) to prepare an anisole/methylethylketone mixed solution of polysulfone resin with a solid content of 20 wt %.

A roll coater was used to apply this solution on a polyester film, which was then put into a heating oven with a temperature of 140° C. The temperature was then raised to 210° C. at the maximum temperature rising rate which would not cause foaming in the applied film-like product, and the drying process was continued until the amount of the residual solvent in the film was 1 wt % or less. Finally, the film was peeled to obtain a polysulfone resin film with a thickness of 50 micrometers.

The drying time was as short as 1 minute. The film thus obtained had a cloudiness (haze) of 0.15%, a smooth surface, excellent transparency and excellent thickness accuracy.

Example 3

A lip coater was used to apply the anisole solution of the polysulfone resin used in Example 1 on a stainless steel plate, which was then put into a heating oven with a temperature of 140° C. The temperature was then raised to 210° C. at the maximum temperature rising rate which would not cause foaming in the applied film-like product, and the drying process was continued until the amount of the residual solvent in the film was 1 wt % or less. Finally, the film was peeled to obtain a polysulfone resin film with a thickness of 100 micrometers.

The drying time was as short as 3 minutes. The film thus obtained had a cloudiness (haze) of 0.19%, a smooth surface, excellent transparency and excellent thickness accuracy.

Example 4

A lip coater was used to apply the anisole solution of the polysulfone resin used in Example 1 on a glass coated stainless steel plate, which was then put into a heating oven with a temperature of 140° C. The temperature was then raised to 210° C. at the maximum temperature rising rate which would not cause foaming in the applied film-like product, and the drying process was continued until the amount of the residual solvent in the film was 1 wt % or less. Finally, the film was peeled to obtain a polysulfone resin film with a thickness of 100 micrometers.

The drying time was as short as 3 minutes. The film thus obtained had a cloudiness (haze) of 0.18%, a smooth surface, excellent transparency and excellent thickness accuracy.

Example 5

Udel-polysulfone resin with a weight average molecular weight (in polystyrene equivalent) of approximately 60,000 (product name P-3500 from Teijin Amoko engineering Plastic Co., Ltd.) was dissolved in dioxane to prepare a dioxane solution of polysulfone resin with a solid content of 25 wt %.

A roll coater was used to apply this solution on a polyester film, which was then put into a heating oven with a temperature of 100° C. The temperature was then raised to 170° C. at the maximum temperature rising rate which would not cause foaming in the applied film-like product, and the drying process was continued until the amount of the residual solvent in the film was 1 wt % or less. Finally, the film was peeled to obtain a polysulfone resin film with a thickness of 50 micrometers.

The drying time was as short as 1 minute. The film thus obtained had a cloudiness (haze) of 0.12%, a smooth surface, excellent transparency and excellent thickness accuracy.

Example 6

The polysulfone resin used in Example 5 was dissolved in a mixed solution of dioxane and methylethylketone (weight ratio 8:2) to prepare a dioxane/methylethylketone mixed solution of polysulfone resin with a solid content of 20 wt %.

A roll coater was used to apply this solution on a polyester film, which was then put into a heating oven with a temperature of 100° C. The temperature was then raised to 170° C. at the maximum temperature rising rate which would not cause foaming in the applied film-like product, and the drying process was continued until the amount of the residual solvent in the film was 1 wt % or less. Finally, the film was peeled to obtain a polysulfone resin film with a thickness of 50 micrometers.

The drying time was as short as 1 minute. The film thus obtained had a cloudiness (haze) of 0.14%, a smooth surface, excellent transparency and excellent thickness accuracy.

Example 7

A lip coater was used to apply the dioxane solution of the polysulfone resin used in Example 5 on a stainless steel plate, which was then put into a heating oven with a temperature of 100° C. The temperatures was then raised to 170° C. at the maximum temperature rising rate which would not cause foaming in the applied film-like product, and the drying process was continued until the amount of the residual solvent in the film was 1 wt % or less. Finally, the film was peeled to obtain a polysulfone resin film with a thickness of 100 micrometers.

The drying time was as short as 3 minutes. The film thus obtained had a cloudiness (haze) of 0.18%, a smooth surface, excellent transparency and excellent thickness accuracy.

Example 8

A lip coater was used to apply the dioxane solution of the polysulfone resin used in Example 5 on a glass coated stainless steel plate, which was then put into a heating oven with a temperature of 100° C. The temperature was then raised to 170° C. at the maximum temperature rising rate which would not cause foaming in the applied film-like product, and the drying process was continued until the amount of the residual solvent in the film was 1 wt % or less. Finally, the film was peeled to obtain a polysulfone resin film with a thickness of 100 micrometers.

The drying time was as short as 3 minutes. The film thus obtained had a cloudiness (haze) of 0.16%, a smooth surface, excellent transparency and excellent thickness accuracy.

Example 9

Udel-polysulfone resin with a weight average molecular weight (in polystyrene equivalent) of approximately 60,000 (product name P-3500 from Teijin Amoko Engineering Plastic Co., Ltd.) was dissolved in tetrahydropyrane to prepare a tetrahydropyrane solution of polysulfone resin with a solid content of 25 wt %.

A roll coater was used to apply this solution on a polyester film, which was then put into a heating oven with a temperature of 80° C. The temperature was then raised to 150° C. at the maximum temperature rising rate which would not cause foaming in the applied film-like product, and the drying process was continued until the amount of the residual solvent in the film was 1 wt % or less. Finally, the film was peeled to obtain a polysulfone resin film with a thickness of 50 micrometers.

The drying time was as short as 1 minute. The film thus obtained had a cloudiness (haze) of 0.13%, a smooth surface, excellent transparency and excellent thickness accuracy.

Example 10

The polysulfone resin used in Example 9 was dissolved in a mixed solution of tetrahydropyrane and methylethylketone (weight ratio 5:5) to prepare a tetrahydropyrane/methylethylketone mixed solution of polysulfone resin with a solid content of 20 wt %.

A roll coater was used to apply this solution on a polyester film, which was then put into a heating oven with a temperature of 80° C. The temperature was then raised to 150° C. at the maximum temperature rising rate which would not cause foaming in the applied film-like product, and the drying process was continued until the amount of the residual solvent in the film was 1 wt % or less. Finally, the film was peeled to obtain a polysulfone resin film with a thickness of 50 micrometers.

The drying time was as short as 1 minute. The film thus obtained had a cloudiness (haze) of 0.16%, a smooth surface, excellent transparency and excellent thickness accuracy.

Example 11

A lip coater was used to apply the tetrahydropyrane solution of the polysulfone resin used in Example 9 on a stainless steel plate, which was then put into a heating oven with a temperature of 80C. The temperature was then raised to 150° C. at the maximum temperature rising rate which would not cause foaming in the applied film-like product, and the drying process was continued until the amount of the residual solvent in the film was 1 wt % or less. Finally, the film was peeled to obtain a polysulfone resin film with a thickness of 100 micrometers. The drying time was as short as 3 minutes. The film thus obtained had a cloudiness (haze) of 0.17%, a smooth surface, excellent transparency and excellent thickness accuracy.

Example 12

A lip coater was used to apply the tetrahydropyrane solution of the polysulfone resin used in Example 9 on a glass coated stainless steel plate, which was then put into a heating oven with a temperature of 80° C. The temperature was then raised to 150° C. at the maximum temperature rising rate which would not cause foaming in the applied film-like product, and the drying process was continued unfit the amount of the residual solvent in the film was 1 wt % or less. Finally, the film was peeled to obtain a polysulfone resin film with a thickness of 100 micrometers.

The drying time was as short as 3 minutes. The film thus obtained had a cloudiness (haze) of 0.16%, a smooth surface, excellent transparency and excellent thickness accuracy.

Comparative Example 1

The polysulfone resin used in Example 1 was dissolved in methylene chloride to prepare a methylene chloride solution of polysulfone resin with a solid content of 35 wt %.

A roll coater was used to apply this solution on a polyester film, which was then put into a heating oven with a temperature of 30° C. The temperature was then raised to 170° C. at the maximum temperature rising rate which would not cause foaming in the applied film-like product, and the drying process was continued until the mount of the residual solvent in the film was 1 wt % or less. Finally, the film was peeled to obtain a polysulfone resin film with a thickness of 50 micrometers.

The drying time was 5 minutes, which was longer than that of Example 1. The film thus obtained had a cloudiness (haze) of 0.58%, which was higher than that of Example 1.

Comparative Example 2

The polysulfone resin used in Example 5 was dissolved in methylene chloride to prepare a methylene chloride solution of polysulfone resin with a solid content of 25 wt %.

A roll coater was used to apply this solution on a polyester film, which was then put into a heating oven with a temperature of 30° C. The temperature was then raised to 170° C. at the maximum temperature rising rate which would not cause foaming in the applied film-like product, and the drying process was continued until the amount of the residual solvent in the film was 1 wt % or less. Finally, the film was peeled to obtain a polysulfone resin film with a thickness of 50 micrometers.

The drying time was 7 minutes, which was longer than that of Example 5. The film thus obtained had a cloudiness (haze) of 0.55%, which was higher than that of Example 5.

Comparative Example 3

A polysulfone resin film was obtained in the same manner as Comparative Example 2 except for the fact that the solid content was changed to 20 wt % and that the film thickness of the polysulfone resin film was changed to 100 micrometers.

The drying time was 12 minutes, which was longer than that of Comparative Example 2. The film thus obtained had a cloudiness (haze) of 0.58%, which was slightly higher than that of Comparative Example 2.

Example 13

A roll coater was used to apply the anisole solution of the polysulfone resin used in Example 1 on a polyester film, which was then put into a heating oven with a temperature of 140° C. The temperature was then raised to 210° C. at the maximum temperature rising rate which would not cause foaming in the applied film-like product, and the drying process was continued until the amount of the residual solvent in the film was 1 wt % or less. The drying time was as short as 2 minutes.

The film was then peeled to obtain a polysulfone resin film with a thickness of 75 micrometers. This film was stretched by heated rolls, by means of vertical uniaxial stretching, with a stretching roll temperature of 190° C. and a stretching ratio of 1.4 to obtain a retardation film with a thickness of 65 micrometers and a retardation value at the incident beam wavelength 590 nm of 465 nm.

This retardation film had a cloudiness (haze) of 0.15%, a smooth surface, excellent transparency and excellent thickness accuracy.

Comparative Example 4

A roll coater was used to apply the methylene chloride solution of the polysulfone resin used in Comparative Example 1 on a polyester film, which was then put into a heating oven with a temperature of 30° C. The temperature was then raised to 170° C. at the maximum temperature rising rate which would not cause foaming in the applied film-like product, and the drying process was continued until the amount of the residual solvent in the film was 1 wt % or less. The drying time was 8 minutes, which was longer than that of Example 13.

The film was then peeled to obtain a polysulfone resin film with a thickness of 75 micrometers. This film was stretched by heated rolls, by means of vertical uniaxial stretching, with a stretching roll temperature of 190° C. and a stretching ratio of 1.4 to obtain a retardation film with a thickness of 65 micrometers and a retardation value at the incident wavelength 590 nm of 465 nm.

This retardation film had a cloudiness (haze) of 0.56%, which was higher than that of Example 13.

The present invention provides a method which uses the solution casting method to manufacture, with high productivity, a high-quality polysulfone resin film with superior transparency and such. By uniaxially stretching of this film the present invention also provides a method to manufacture a retardation film with superior optical properties.

The polysulfone resin film obtained by the present invention is not only superior in quality, as described above, but also superior in various properties including mechanical strength, electrical properties, optical properties, heat resistance, chemical resistance and flame resistance and, therefore, it can be used in a wide range of applications. In particular, a retardation film of the present invention obtained by a uniaxially stretching process, for example, is used as an optical filter such as a phase retarder for a liquid crystal display device.

The method of manufacturing a polysulfone resin film of the present invention can be used for a method of manufacturing a resin film with the solution casting method which uses not only polysulfone resin but also polycarbonate resin and polyarylate resin for the casting resin solution.

What is claimed is:

1. In a method of manufacturing a polysulfone resin film using solution casting in which a solution of polysulfone resin is cast on a support piece to a desired thickness, dried to remove solvent, and resultant resin film is then peeled from the support piece, the improvement comprising:

casting a solution of polysulfone resin comprising at least one first solvent selected from the group consisting of anisole, dioxane, and tetrahydropyrane.

2. The method of claim 1, further comprising including in the casting solution of polysulfone resin at least one second solvent selected from the group consisting of acetone, methylethylketone, ethyl acetate, toluene and phenol.

3. The method of claim 1, wherein the weight average molecular weight of the polysulfone resin is from about 20,000 to 100,000.

4. The method of claim 1, wherein the viscosity of the polysulfone resin solution is $1 \times 10^3$ to $1 \times 10^5$ cps.

5. The method of claim 2, wherein said second solvent comprises 60 wt. % or less of total solvent in the solution of polysulfone resin.

6. A polysulfone resin film produced according to claim 1.

7. A polysulfone resin film produced according to claim 2.

8. A method of manufacturing a retardation film obtained by uniaxially stretching a polysulfone resin film produced according to claim 1.

9. The method of claim 8, wherein the stretching ratio is 1.1–2.

10. A method of manufacturing a retardation film obtained by uniaxially stretching a polysulfone resin film produced according to claim 2.

11. The method of claim 10, wherein the stretching ratio is 1.1–2.

12. A retardation film produced according to claim 8.

13. A retardation film produced according to claim 9.

14. A retardation film produced according to claim 10.

15. A retardation film produced according to claim 11.

* * * * *